(12) United States Patent
Kwon et al.

(10) Patent No.: US 11,979,265 B2
(45) Date of Patent: May 7, 2024

(54) LEARNING-BASED COMMON PHASE ERROR ESTIMATION

(71) Applicant: SAMSUNG ELECTRONICS CO., LTD., Suwon-si (KR)

(72) Inventors: Hyukjoon Kwon, San Diego, CA (US); Mu-Sheng Lin, San Diego, CA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 0 days.

(21) Appl. No.: 17/694,369

(22) Filed: Mar. 14, 2022

(65) Prior Publication Data

US 2022/0329469 A1 Oct. 13, 2022

Related U.S. Application Data

(60) Provisional application No. 63/190,661, filed on May 19, 2021, provisional application No. 63/174,448, filed on Apr. 13, 2021.

(51) Int. Cl.
*H04W 72/0446* (2023.01)
*H04L 5/00* (2006.01)
*H04L 27/00* (2006.01)

(52) U.S. Cl.
CPC ........ *H04L 27/0014* (2013.01); *H04L 5/0007* (2013.01); *H04W 72/0446* (2013.01); *H04L 2027/0067* (2013.01)

(58) Field of Classification Search
CPC ............... H04L 27/0014; H04L 5/0007; H04L 2027/0067; H04W 72/0446
See application file for complete search history.

(56) References Cited

U.S. PATENT DOCUMENTS

| 2018/0198651 A1* | 7/2018 | Kundargi | ............ H04L 25/0204 |
| 2023/0043708 A1* | 2/2023 | Huh | ......................... H04B 7/10 |

FOREIGN PATENT DOCUMENTS

| CN | 112600772 | 4/2021 |
| CN | 113726711 | 11/2021 |
| EP | 3451601 A1 | 3/2019 |

OTHER PUBLICATIONS

Wada, et al.; A Denoising Autoencoder based wireless channel transfer function estimator for OFDM communication system; Department of Information Engineering, University of the Ryukyus, Okinawa JP; © 2019 IEEE; pp. 530-533.

Ye, et al.; Power of Deep Learning for Channel Estimation and Signal Detection in OFDM Systems; IEEE Wireless Communications Letters; vol. 7, No. 1, Feb. 2018; pp. 114-117.

\* cited by examiner

*Primary Examiner* — Janice N Tieu
(74) *Attorney, Agent, or Firm* — Lewis Roca Rothgerber Christie LLP

(57) ABSTRACT

A method of modifying a common phase error (CPE) estimate of a slot including symbols, the method including receiving a CPE value corresponding to a symbol of a slot by an artificial neural network, generating a modified CPE value with the artificial neural network, and outputting the modified CPE value from the artificial neural network.

16 Claims, 8 Drawing Sheets

LEARNING-BASED COMMON PHASE ERROR ESTIMATION

CROSS-REFERENCE TO RELATED APPLICATION(S)

The present application claims priority to, and the benefit of, U.S. Provisional Application No. 63/174,448, filed Apr. 13, 2021, entitled "DEEP LEARNING-BASED CHANNEL COMMON PHASE ESTIMATION," U.S. Provisional Application No. 63/190,661, filed May 19, 2021, entitled "DEEP LEARNING-BASED CHANNEL COMMON PHASE ESTIMATION," the entire content of both of which being incorporated herein by reference.

FIELD

One or more aspects of embodiments of the present disclosure relate to improved common phase error (CPE) estimation associated with wireless communication.

BACKGROUND

Cellular systems, such as fourth- and fifth-generation systems (4G and 5G systems), are based on orthogonal frequency division multiplexing (OFDM). A benefit of OFDM systems is that subcarriers are orthogonal to each other, and therefore may save bandwidth by allowing for overlapping, as compared to a traditional frequency division multiplexing (FDM) system. However, challenges may arise from OFDM technology, as it may be sensitive to carrier frequency offsets and/or random phase offsets, which may cause inter-carrier-interference (ICI) due to non-orthogonality.

One type of random phase offset may result from phase noise, which may be due to radio frequency (RF) impairment on frequency synthesizers (e.g., RF impairment on voltage control oscillators). Further, the effect of phase noise may be relatively significant on higher-order modulation schemes, such as 64-QAM (quadrature amplitude modulation) and 256-QAM modulation schemes.

For wireless modem development, common phase error (CPE) estimation on phase noise may be used to assist the channel estimation (CE) procedure on received signals. To perform CPE estimation in 5G New Radio (NR) systems, the estimate is based on one or more reference signals (RSs) including one or more demodulation reference signals (DMRSs), one or more phase tracking reference signals (PTRSs), or both demodulation and phase tracking reference signals with various configurations. However, a CPE estimation method may have limitations when only a front-loaded DMRS is available (e.g., when only a DMRS at the beginning of a slot is available), and/or when the time density of a PTRS is large (e.g., when a number of OFDM symbols between consecutive PTRSs is relatively large).

Accordingly, it may be suitable to remedy the effect of phase noise prior to channel estimation and symbol detection.

It should be noted that information disclosed in this Background section is only for enhancement of understanding of the embodiments of the present disclosure and may include technical information acquired in the process of achieving the inventive concept. Therefore, it may contain information that does not form prior art.

SUMMARY

According to some embodiments of the present disclosure, there is provided a method of modifying a common phase error (CPE) estimate of a slot including symbols, the method including receiving a CPE value corresponding to a symbol of a slot by an artificial neural network, generating a modified CPE value with the artificial neural network, and outputting the modified CPE value from the artificial neural network.

The method may further include performing common phase estimation on a reference signal (RS) symbol of the slot, and interpolating the CPE value on a non-RS symbol of the slot.

The method may further include outputting the modified CPE value to a channel estimation module.

The method may further include concurrently receiving a number of CPE values including the CPE value by the artificial neural network, the number of CPE values being equal to a number of the symbols of the slot.

The method may further include concurrently receiving a number of CPE values including the CPE value by the artificial neural network, the number of CPE values being less than a number of the symbols of the slot.

The method may further include receiving at least one of the CPE values by the artificial neural network at least twice.

The method may further include receiving an additional CPE value by the artificial neural network separately from the CPE values including the CPE value.

The CPE value that is received by the artificial neural network may include either a calculated CPE value that is calculated based on a reference signal (RS) of an orthogonal frequency division multiplexing (OFDM) symbol, or an interpolated CPE value for a non-RS of an OFDM symbol.

The method may further include training the artificial neural network using a measured phase noise model.

According to some embodiments of the present disclosure, there is provided a CPE estimation device including an artificial neural network configured to receive a CPE value corresponding to a symbol of a slot, generate a modified CPE value, and output the modified CPE value.

The CPE estimation device of claim 10, wherein the CPE value received by the artificial neural network is generated by performing common phase estimation on a reference signal (RS) symbol of the slot, and interpolating the CPE value on a non-RS symbol of the slot.

The artificial neural network may be further configured to output the modified CPE value to a channel estimation module.

The artificial neural network may be further configured to receive a number of CPE values including the CPE value, the number of CPE values being equal to a number of the symbols of the slot.

The artificial neural network may be further configured to receive a number of CPE values including the CPE value, the number of CPE values being less than a number of the symbols of the slot.

The artificial neural network may be further configured to receive at least one of the CPE values at least twice.

The artificial neural network may be further configured to receive an additional CPE value separately from the CPE values including the CPE value.

The CPE value may include either a calculated CPE value that is calculated based on a reference signal (RS) of an orthogonal frequency division multiplexing (OFDM) symbol, or an interpolated CPE value for a non-RS of an OFDM symbol.

The artificial neural network may be further configured to be trained using a measured phase noise model.

According to some embodiments of the present disclosure, there is provided a non-transitory computer readable medium implemented with a CPE estimation device including an artificial neural network, the non-transitory computer readable medium having computer code that, when executed on a processor, implements a method of modifying a CPE estimate of a slot including symbols, the method including receiving, by the artificial neural network, a CPE value corresponding to a symbol of a slot to the artificial neural network, generating, by the artificial neural network, a modified CPE value with the artificial neural network, and outputting, by the artificial neural network, the modified CPE value from the artificial neural network.

The CPE value received by the artificial neural network may be generated by performing common phase estimation on a reference signal (RS) symbol of the slot, and interpolating the CPE value on a non-RS symbol of the slot.

Accordingly, embodiments of the present disclosure are able to improve CPE estimation in real time, to provide robust operation despite varying channel conditions and numerology, to improve signal-to-noise (SNR) ratio gain, and/or to improve BLER performance.

BRIEF DESCRIPTION OF THE DRAWINGS

These and other aspects of the present disclosure will be appreciated and understood with reference to the specification, claims, and appended drawings wherein:

DETAILED DESCRIPTION

Figure 1:
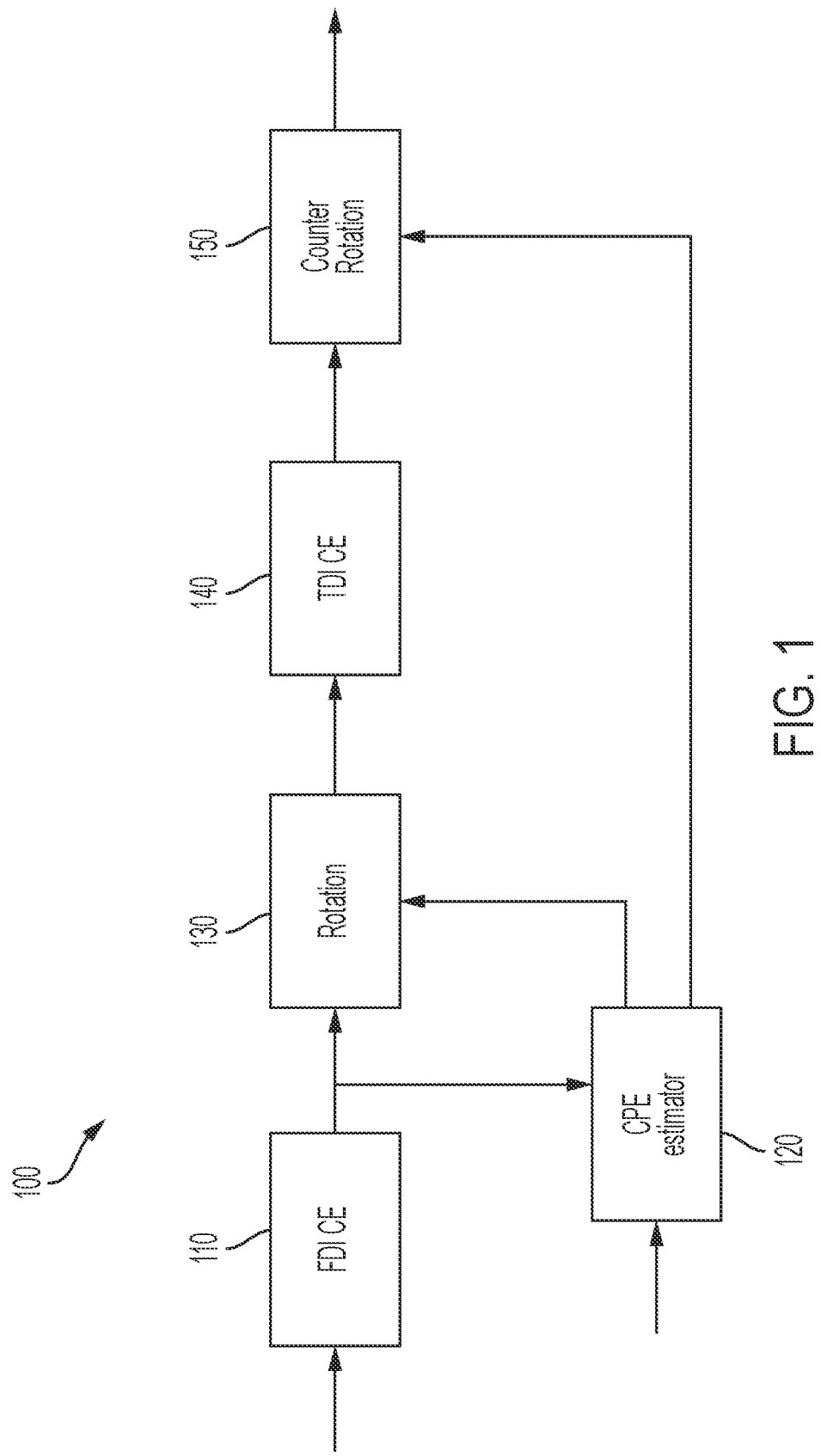
FIG. 1 is a block diagram depicting a method of channel estimation (CE) with common phase error (CPE) compensation, according to some embodiments of the present disclosure.

Aspects of some embodiments of the present disclosure and methods of accomplishing the same may be understood more readily by reference to the detailed description of embodiments and the accompanying drawings. Hereinafter, embodiments will be described in more detail with reference to the accompanying drawings. The described embodiments, however, may be embodied in various different forms, and should not be construed as being limited to only the illustrated embodiments herein. Rather, these embodiments are provided as examples so that this disclosure will be thorough and complete, and will fully convey the aspects of the present disclosure to those skilled in the art. Accordingly, processes, elements, and techniques that are not necessary to those having ordinary skill in the art for a complete understanding of the aspects of the present disclosure may not be described.

Unless otherwise noted, like reference numerals, characters, or combinations thereof denote like elements throughout the attached drawings and the written description, and thus, descriptions thereof will not be repeated. Further, parts not related to the description of the embodiments might not be shown to make the description clear.

In the detailed description, for the purposes of explanation, numerous specific details are set forth to provide a thorough understanding of various embodiments. It is apparent, however, that various embodiments may be practiced without these specific details or with one or more equivalent arrangements. Additionally, as those skilled in the art would realize, the described embodiments may be modified in various different ways, all without departing from the spirit or scope of the present disclosure. In other instances, well-known structures and devices are shown in block diagram form to avoid unnecessarily obscuring various embodiments.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure. The description of an element as a "first" element may not require or imply the presence of a second element or other elements. The terms "first", "second", etc. may also be used herein to differentiate different categories or sets of elements. For conciseness, the terms "first", "second", etc. may represent "first-category (or first-set)", "second-category (or second-set)", etc., respectively.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure."

When one or more embodiments may be implemented differently, a specific process order may be performed differently from the described order. For example, two consecutively described processes may be performed substantially at the same time or performed in an order opposite to the described order.

The electronic or electric devices and/or any other relevant devices or components according to embodiments of the present disclosure described herein may be implemented utilizing any suitable hardware, firmware (e.g., an application-specific integrated circuit), software, or a combination of software, firmware, and hardware, to process data or digital signals. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Circuit hardware may include, for example, application specific integrated circuits (ASICs), general purpose or special purpose central processing units (CPUs) that is configured to execute instructions stored in a non-transitory storage medium, digital signal processors (DSPs), graphics processing units (GPUs), and programmable logic devices such as field programmable gate arrays (FPGAs).

Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the embodiments of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Some embodiments of the present disclosure correspond to a learning-based method for estimating common phase error (CPE) to refine, or modify, a CPE that is initially estimated from one or more other algorithms, thereby more closely estimating a final CPE to improve signal quality. That is, embodiments of the present disclosure may include a learning-based CPE algorithm to enhance interpolated CPE results, which may improve with substantial signal-to-noise ratio (SNR) gain. Also, the learning-based CPE algorithm may have robustness in other scenarios as well, such as on various channel conditions and different numerologies in new radio (NR) systems. Further, the learning-based CPE algorithm may improve block error rate (BLER) performance, and may be relatively more robust to different channel conditions, such as analog antenna settings, and to various numerology.

As mentioned above, a CPE estimation method may have limitations when only a front-loaded demodulation reference signal (DMRS) is available for purposes of performing CPE estimation, or when the time density of a phase tracking reference signal (PTRS) is large.

Phase noise may be recognized as an radio frequency (RF) impairment when operating at FR2 (e.g., within Frequency range 2, which is between about 24.25 GHz to about 52.6 GHz). Phase noise may be due to an RF synthesizer, which may manifest wider power spectrum density when compared to an impulse shape for an ideal oscillator.

In Radio Layer 1 (RAN1), which corresponds to the standard specification of the physical layer of radio interfaces of mobile devices, a phase noise model may be found in the corresponding specification (e.g., technical report (TR) 38.803). However, the model itself may be outdated, and may have much larger power spectral density (PSD).

An RF-integrated circuit (IC) measured phase noise model may be based on lab measurement from RF chips to improve accuracy. The reference integrated phase noise (IPN) may be about −30 dBc at about 28 GHz.

When comparing a phase noise PSD model for both a RAN1 measurement and an RF-IC measurement, the RAN1 measurement may generally have a much larger phase noise PSD than the RF-IC measurement (e.g., in a frequency offset range from about 10 kHz to about 100 kHz).

FIG. 1 is a block diagram depicting a method of channel estimation (CE) with CPE compensation, according to some embodiments of the present disclosure.

Referring to FIG. 1, an example of an algorithm of embodiments of the present disclosure are described below with respect to a delta CPE estimation method 100. The effect of phase noise may be analyzed as a CPE component and a separate inter-carrier-interference (ICI) component. The CPE and ICI components may generate an error floor on block error rate (BLER).

The ICI component may be solved by a suitable deliberate cancellation scheme. To cancel inter-carrier-interference (ICI) components, it may suitable to know the transmitted signal based on either a received known pilot signal, or based on detecting/decoding a feedback signal and increasing (e.g., relatively significantly) receiver complexity. However, detecting/decoding the feedback signal may generally worsen processing delay, and may complicate scheduling among hardware modules.

In the event that the ICI component is not relatively large, CPE compensation may be generally a low-complexity solution. To estimate the CPE, a scheme may average observations among subcarriers to form the phase estimator, and to estimate the phases from consecutive orthogonal frequency division multiplexing (OFDM) symbols referring to a certain OFDM symbol of a slot. However, some CPE schemes may have limitations, such as when reference signals (RS) are limited and are not sufficiently dense in the time domain.

Some OFDM symbols do not have an RS due to different configurations of the slot, and an interpolation process may be used to generate CPE estimates for non-RS OFDM symbols within one slot. For example, according to the current standard (e.g., for normal cyclic prefix (NCP) cases), there are fourteen symbols in each slot (e.g., symbols 0-13). Further, and for example, there may be a reference signal RS on one or more of the fourteen symbols, while the remaining symbols of the slot do not have an RS thereon. For non-RS symbols (the symbols not containing an RS), interpolation may be performed to determine the CPE estimates corresponding to the respective OFDM symbols in the slot.

As an example, and as depicted in FIG. 1, a delta CPE method 100 may be used. Initially, frequency domain interpolation channel estimation (FDI CE) 110 may be performed on symbols of a received slot. Then CPE estimates may be estimated 120 (e.g., for RS OFDM symbols). Then, the estimated CPE may be rotated 130.

In the time domain for CE purposes, different OFDM symbols may be suitably compensated to the corresponding CPE in each OFDM symbol, such that all of the OFDM symbols are "aligned" in the sense that time domain interpolation (TDI) may be applied thereto. Accordingly, time domain interpolation channel estimation (TDI CE) 140 may be performed on the aligned symbols.

CPE interpolation on non-RS symbols may be performed by either a linear filter, or an minimum mean square estimation (MMSE) filter (e.g., a correlation matrix may be measured from PTRS locations with time density equal to 1). Currently, existing technology generally uses either linear interpolation, or MMSE interpolation, the easiest method of interpolation being linear interpolation. However, interpolation may generate inaccurate CPE estimates, depending on the interpolation methods applied.

For example, the linear interpolation method may perform poorly when time density of PTRS symbols is large (e.g., when a number of symbols between consecutive symbols containing a PTRS is large). As a further example, the MMSE interpolation method uses different covariance matrices based on scenarios, such as different numerologies (e.g., differences in subcarrier spacing), which may lead to different covariance matrixces.

After the TDI 140 is performed, the results of the time domain interpolation may be de-rotated/counter rotated 150 to the same degree by which each individual CPE value at each symbol was previously rotated 130. It may be noted that when the PTRS time density is not equal to 1, CPE interpolation on non-RS symbols is generally necessary before the CPE estimates are sent to the rotation module 130 and the de-rotation/counter rotation module 150.

As for the CPE estimates corresponding to the respective OFDM symbols, DMRSs and PTRSs are used as pilots to estimate the CPE estimates. Further, the summation is over the index set corresponding to an intersection of a DMRS index set and a PTRS index set in the frequency domain.

It may be noted that, when the ICI component is not relatively large, the estimate of the CPE may be obtained by the CPE estimator 120 by averaging the estimates among all of the PTRS subcarriers.

Figure 2:
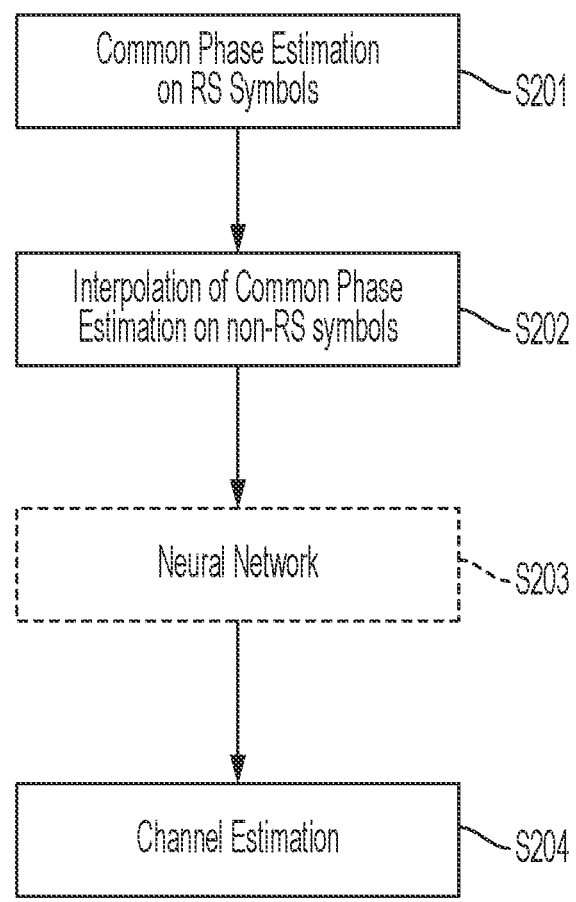
FIG. 2 is a block diagram depicting a dataflow of CPE estimation and channel estimation, according to some embodiments of the present disclosure.

FIG. 2 is a block diagram depicting a dataflow of CPE estimation and channel estimation, according to some embodiments of the present disclosure.

Referring to FIG. 2, embodiments of the present disclosure correspond to a learning-based CPE estimation algorithm. For example, a supervised machine learning technique of embodiments of the present disclosure may utilize a neural network (e.g., an artificial neural network 300 of FIG. 3, which may be referred to as an improved CPE estimator or as a CPE estimation device) to refine, or modify, the delta CPE method 100 discussed above with respect to FIG. 1.

According to some embodiments, a signal may be received from a base station. The signal may include one or more slots individually comprised of multiple symbols. After receiving the signal, CPE estimation may be performed on one or more corresponding RS symbols of the slot (operation S201).

The CPE estimate for each OFDM symbol may be from one of a DMRS signal, a PTRS signal, or an interpolation between a DMRS's signal or a PTRS's signal.

Then, interpolation (e.g., initial interpolation or additional interpolation) of CPE estimates on non-RS symbols may be performed to generate scalar values for each of the non-RS symbols (operation S202).

Outputs of the interpolated delta CPE estimate described above (e.g., corresponding to the CPE estimator 120 in FIG. 1) may serve as inputs of a neural network (e.g., neural network 300 of FIG. 3) for refining the CPE estimates for the RS and non-RS symbols (operation S203). For example, fourteen scalar values indicating CPE estimates respectively corresponding to fourteen symbols of the slot may be sent to the neural network (e.g., artificial neural network) 300.

To achieve better performance, a learning-based CPE estimation algorithm (e.g., the neural network 300 of FIG. 3) of embodiments of the present disclosure may both refine noisy CPE estimates on the received RS symbols, and refine inaccurately interpolated CPE estimates on the non-RS symbols based on learned phase noise distribution (e.g., based on a measured phase noise model). That is, the neural network may refine and/or collect the scalar values corresponding to the RS symbol CPE estimates and non-RS symbol CPE estimates. The neural network may potentially change all fourteen symbols, including RS symbol CPE estimates that are calculated based upon RS symbols received from a base station.

The refined CPE estimate may then be output from the neural network to a channel estimation module, and the results, or outputs, of the neural network then may be used in the CE module to perform channel estimation (operation S204).

Accordingly, the refined CPE estimate output from the neural network may be more robust to different channel conditions, thereby potentially lowering the corresponding BLERs.

Figure 3:
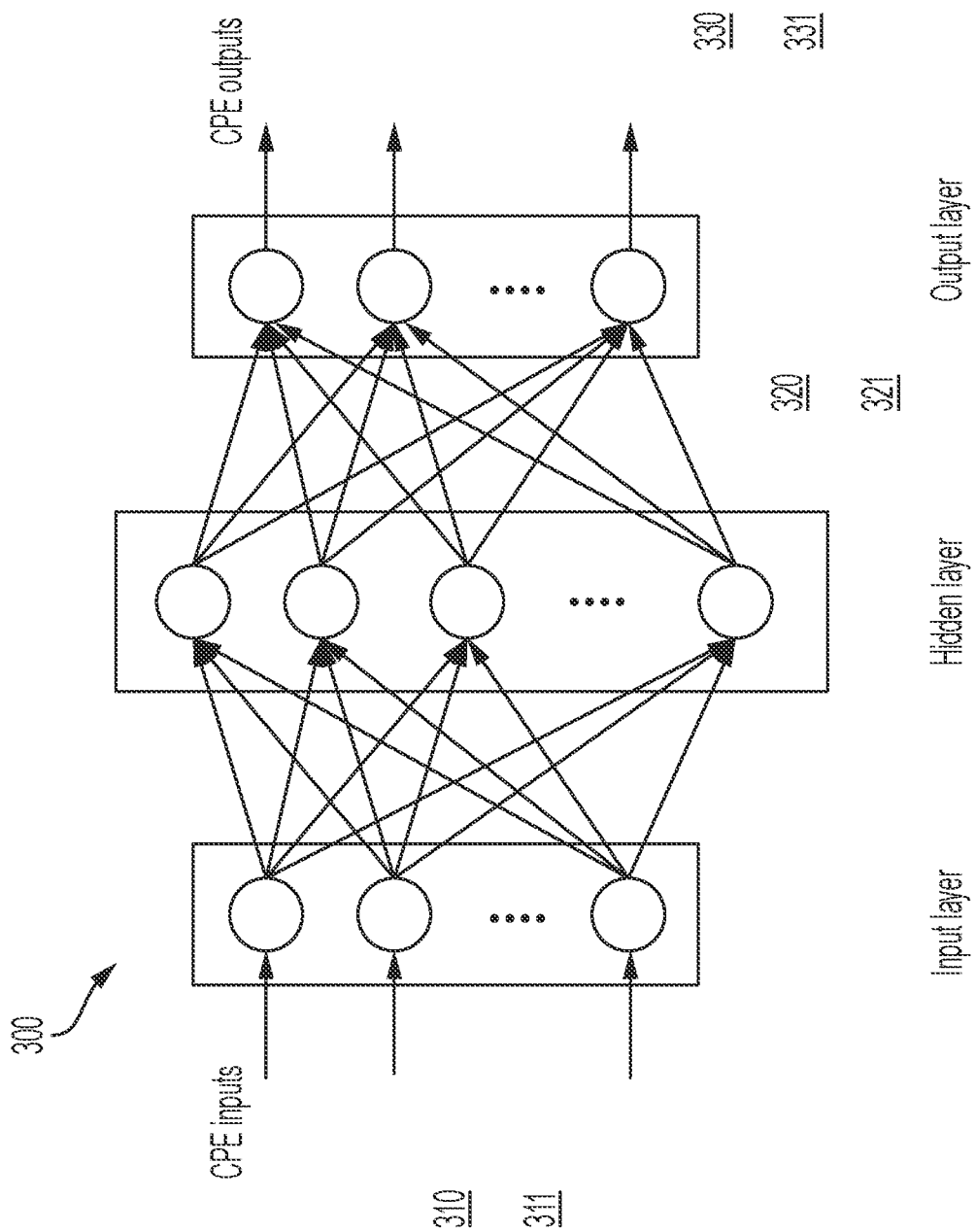
FIG. 3 is a block diagram depicting a structure of a learning-based CPE-estimating neural network, according to some embodiments of the present disclosure.

FIG. 3 is a block diagram depicting a structure of a learning-based CPE-estimating neural network, according to some embodiments of the present disclosure.

Referring to FIG. 3, the structure of the learning-based CPE neural network 300 (e.g., a neural network corresponding to the refining the CPE estimates for the RS and non-RS symbols (operation S203) of FIG. 2) may consist of one input layer 310, one hidden layer 320, and one output layer 330.

At each hidden node 321 of the hidden layer 320, a sigmoid function may be applied as an activation function, which provides nonlinearity to the neural network 300. Further, the activation function at the output layer 330 may be linear. The loss function may be the mean square error (MSE).

The neural network 300 according to some embodiments may include only a single hidden layer 320, although the present disclosure is not limited thereto. The hidden layer 320 may have N hidden nodes 321, N being a natural number.

During a training process for training the neural network 300, interpolated CPE estimates, which may be determined as a result of TDI at each OFDM symbol (e.g., as a result of operation S202 of FIG. 2), may be features that are input to input nodes 311 of the input layer 310 of the neural network 300. Further, labels, which are input to input nodes 311 of the input layer 310 of the neural network 300, may be from ideal frequency domain CPE estimates for each OFDM symbol, and the mean square error (MSE) may be an optimization criterion.

Because the neural network 300 with the above described setting has corresponding denoising capability, wherein a number of the hidden nodes 321 of the hidden layer 320 is larger than a number of input nodes 311 of the input layer 310, the output of the refined CPE estimates from the output nodes 331 of the output layer 330 may be improved when compared to the input CPE estimates that are input into the input nodes 311 of the input layer 310. For example, this may occur when there is an insufficient number of DMRS/PTRS symbols to interpolate the CPE estimates in time domain, or such as when a Doppler effect is large.

As will be discussed in further detail below, embodiments of the present disclosure may have one or more of the following qualities: per-slot processing, flexibility with respect to a chosen interpolation method, enhanced estimation, low processing delay, and low computation complexity.

With respect to the aspect of per-slot processing, as distinguished from cross-slot processing, interpolated CPE estimates may be input features that are input to the input layer 310 of the neural network 300. For example, cross-slot processing is not necessary, or even may be damaging to the system performance, due to the property of the phase noise. That is, adding more slots may hurt performance In NR 5G, the locations of the DMRS/PTRS symbols in the slot are configured by the base station. Further, there may be many different settings, or different combinations, of DRS and PTRS locations, as configured by the base station. For example, for two different DMRS configurations for one OFDM slot with fourteen OFDM symbols, there may be one or two DMRS symbols. As an example, the PTRS time density may be equal to four for both configurations.

However, embodiments of the present disclosure do not depend on patterns or locations of the RS symbol(s) in the slot. Accordingly, the same neural network 300 may be applied to all DMRS symbol patterns and PTRS symbol patterns.

With respect to interpolation flexibility, the outputs of interpolations (e.g., interpolated CPE estimates determined by operation S202 of FIG. 2) may serve as the input features of the neural network 300. Different interpolation methods may correspond to different forms of noise added to the CPE estimates.

However, embodiments of the present disclosure function for all types of CPE estimate interpolations, for example, but not limited to, linear interpolation, MMSE interpolation, binomial interpolation, LaGrange interpolation, or any other type of interpolation.

With respect to estimation enhancement, embodiments of the present disclosure utilize a deep-learning technique to enhance conventional estimators from signal processing (e.g., outputs resulting from operation S202 in FIG. 2). That is, the neural network 300 may function as an estimator enhancer, or as general enhancers to conventional estimators used in signal processing.

Accordingly, the capability of a CPE estimation module (e.g., the CPE estimator 120 of FIG. 1, or a module corresponding to the operation S201 of FIG. 2) and a CE module (e.g., corresponding to the operation S204 of FIG. 2) may be enhanced, thereby improving performance of wireless modem systems. That is, the capability of conventional estimators may be enhanced, thereby enhancing the performance of modem system (e.g., based on measurements of BLER or bit error rate).

The neural network 300 may learn the measured phase noise distribution indirectly from the training process, which may occur offline, via a denoise autoencoder. That is, the denoise autoencoder may be used to assist in training the artificial neural network. The denoise autoencoder may be used to correct noisy and/or inaccurate interpolated CPE estimates.

For example, one or more denoising auto-encoders may be utilized in the image processing field, and may be utilized for unsupervised learning initialization of weights/bias of layers (e.g., the layers 310, 320, and 330 of the neural network 300). Images may be preprocessed to intentionally generate corrupted images as input features of the neural network 300 (denoising auto-encoder), and the neural network 300 may be trained to recover, or repair, the original uncorrupted images to some extent. That is, a denoising auto-encoder may refine noisy CPE estimates from interpolation schemes and indirectly improve the performance of wireless modem applications. Thus, the denoising auto-encoder may serve as a relatively improved CPE estimator according to some embodiments, and may indirectly improve the performance of wireless modem applications.

Further, as related to the training of the neural network 300, the neural network 300 may be robust with respect to different channel conditions. For example, the network may be trained by samples from a tapped delay line (TDL)—A channel only. However, the same network could work for all TDL channels, clustered delay line(CDL) channels, and EPA channels, noting the number of DMRS symbols in one slot may have some impact on the network.

With respect to low processing delay and low computation complexity, embodiments of the present disclosure may also implement non-overlapped sliding windows, or overlapped sliding windows. These implementations may achieve both low processing delay and low computation complexity by processing fewer than all symbols of a slot at a time (e.g., as compared to concurrently processing all fourteen symbols of the slot).

Figure 4:
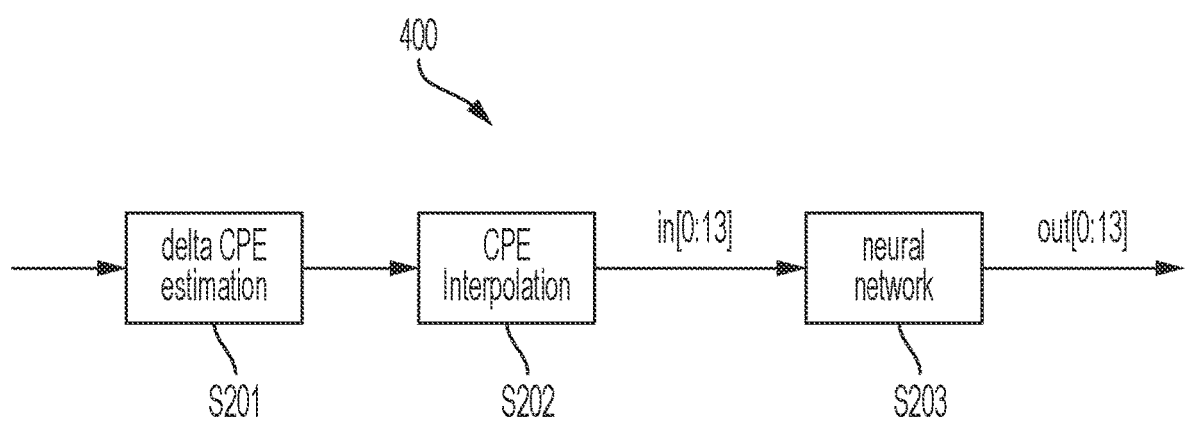
FIG. 4 is a block diagram depicting a dataflow of a first system, according to some embodiments of the present disclosure.
Figure 5:
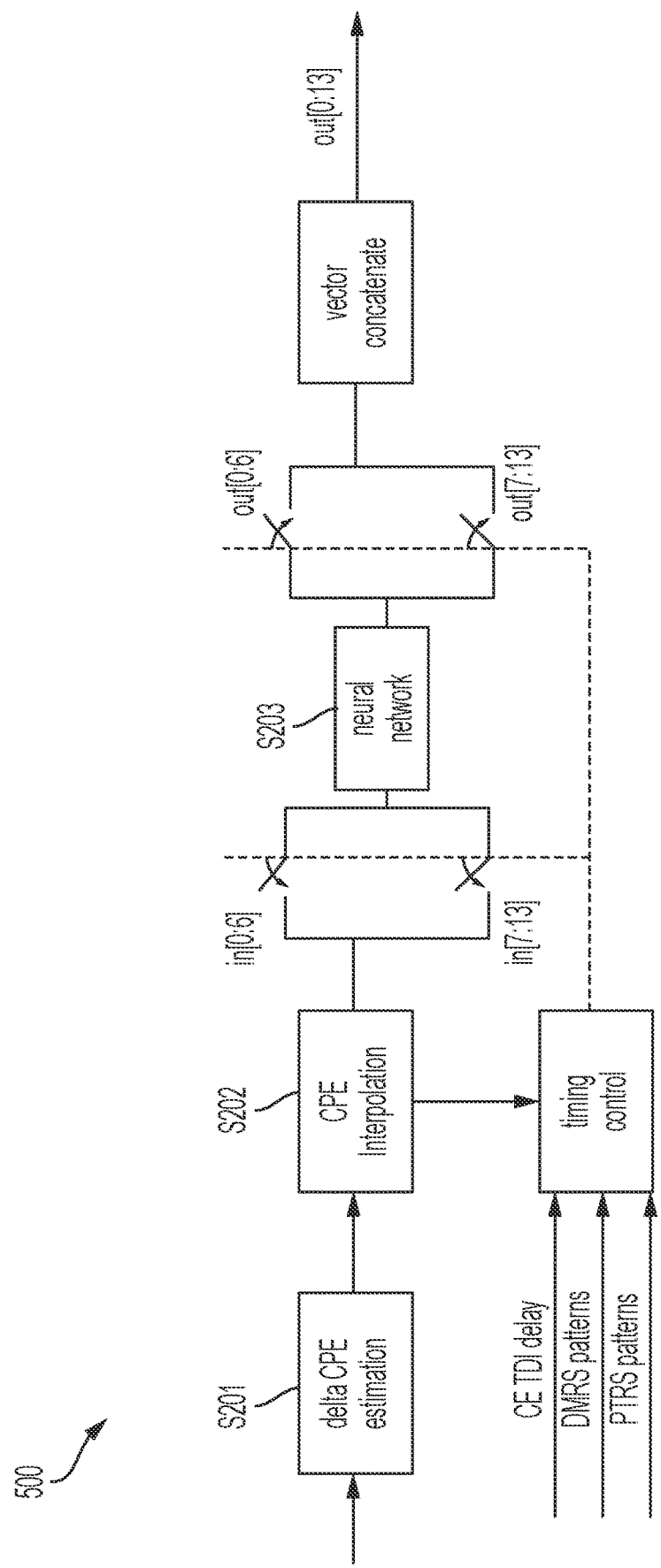
FIG. 5 is a block diagram depicting a dataflow of a system employing non-overlapped sliding windows, according to some embodiments of the present disclosure.
Figure 6:
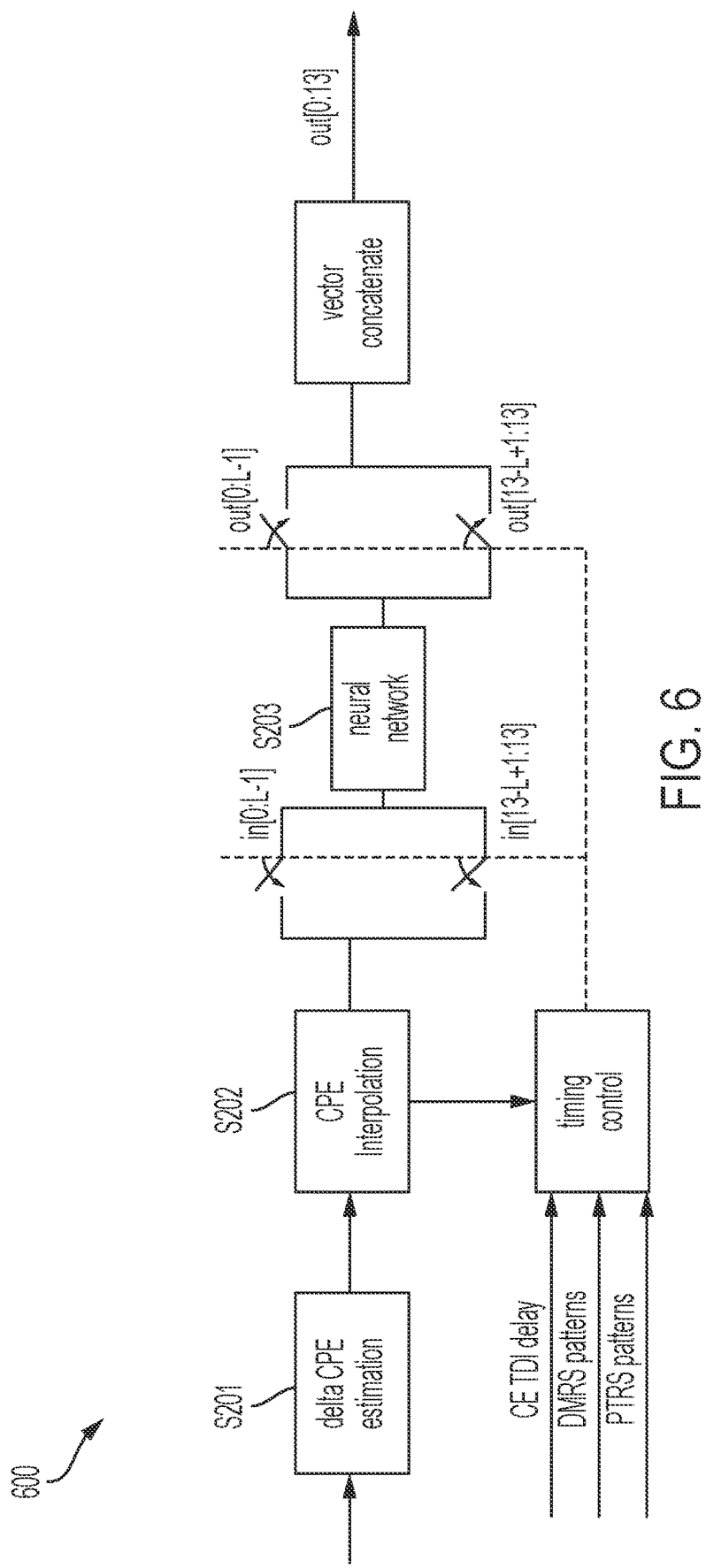
FIG. 6 is a block diagram depicting a dataflow of a system employing overlapped sliding windows, according to some embodiments of the present disclosure.

FIGS. 4, 5, and 6 depict a comparison of different learning-based CPE estimation designs. FIG. 4 is a block diagram depicting a dataflow of a first system, according to some embodiments of the present disclosure, FIG. 5 is a block diagram depicting a dataflow of a system employing non-overlapped sliding windows, according to some embodiments of the present disclosure, and FIG. 6 is a block diagram depicting a dataflow of a system employing overlapped sliding windows, according to some embodiments of the present disclosure.

Referring to FIGS. 4, 5, and 6, embodiments of the present disclosure are capable of low processing delay.

For example, and referring to FIGS. 2, 3, and 4, a learning-based CPE design may use fourteen interpolated CPE estimates (e.g., from operation S202 of FIG. 2) as input features to be input to the input layer 310 of the neural network 300, and sixteen hidden nodes 321 in the hidden layer 320, although the present disclosure is not limited thereto. That is, there may be fourteen input features of the input layer 310 of the first system 400 (e.g., one input for each symbol of the slot). Accordingly, an algorithm implemented by the neural network 300 of embodiments of the present disclosure corresponding to FIG. 4 may be initiated only once the CPE interpolation operation S202 is completed for each of the fourteen symbols, thereby causing processing delay.

However, phase noise is generally weakly related among OFDM symbols, which implies fewer input features (e.g., input to the input nodes 311 of the input layer 310 of the neural network 300), and hence smaller neural networks may be suitable. Accordingly, some embodiments may include smaller neural networks 300 with a reduced number of hidden nodes 321 in the hidden layer 320, thereby reducing complexity of the neural network 300.

Accordingly, some embodiments of the present disclosure may respectively include a non-overlapped system 500 employing non-overlapped sliding windows, as shown in FIG. 5, and include an overlapped system 600 overlapped sliding windows, as shown in FIG. 6, to reduce the processing delay associated with the design shown in FIG. 4. That is, processing delay time may be shortened by not waiting until the end of the slot (e.g., not waiting until the end of the fourteenth/final symbol of the slot is received to begin CPE estimation S201).

In the embodiments corresponding to FIG. 5, there may be seven input features input to the input nodes 311 of the input layer 310 of the neural network 300 in a non-overlapped system 500 implementing non-overlapped sliding windows (e.g., two groups of sever CPE estimates corresponding to the fourteen symbols of the slot).

For example, in the non-overlapped system 500, seven scalar numbers corresponding to seven CPE estimates may be input into the neural network 300, and the neural network may output (e.g., from the output nodes 331 of the output layer 330 of the neural network 300) seven refined CPE estimates. Because this process may begin prior to all of the symbols of the slot being received, processing delay may be improved. Thereafter, the remaining seven CPE estimates may be input to the neural network (e.g., two or more groups of the CPE estimates may be processed serially). Accordingly, as compared to the first system 400 of FIG. 4, the neural network 300 may be smaller (e.g., seven input nodes 311 and seven output nodes 331), and complexity may be lower.

It should be noted that, although a design in which two equal groups of seven CPE estimates is described, the present disclosure is not limited thereto. For example, the non-overlapping windows may correspond to groups of different respective sizes, and the number of groups is not particularly limited.

In the embodiments corresponding to FIG. 6, there may be eight input features of the input layer 310 of the overlapped system 600 implementing overlapped sliding windows. As an example, a first group of CPE estimates corresponding to symbols 0-7 may be initially input to the input nodes 311 of the input layer 310 of the neural network 300. Thereafter, a second group of CPE estimates having some overlap with the first group of CPE estimates (e.g., CPE estimates corresponding to symbols 1-8, or symbols 6-13) may be input to the input nodes 311 of the input layer 310 of the neural network 300. It should be noted that there may be several groups respectively overlapping one or more other groups, and that the respective sizes of the groups may differ from one another.

In comparative examples, there might be no control due to CPE estimates being immediately available at once. Contrastingly, according to some embodiments of the present disclosure, timing control may be utilized, and the timing control may depend on arrival times of the RS symbols and interpolation schemes.

Figure 7:
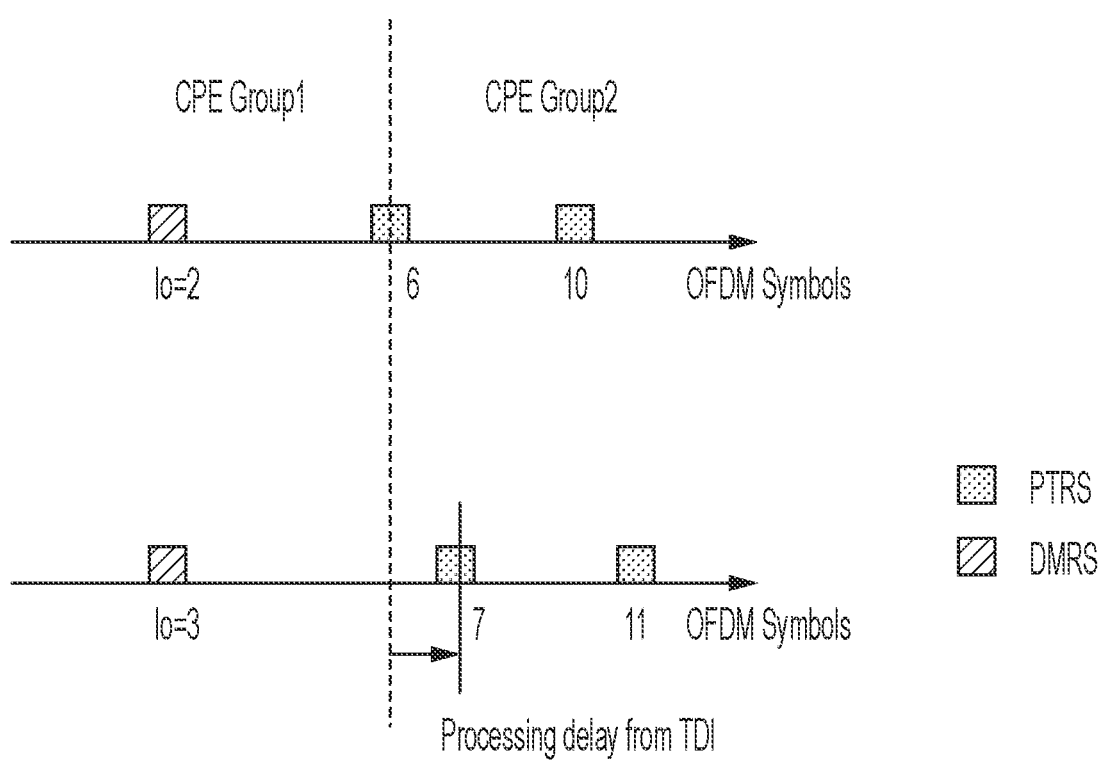
FIG. 7 depicts a "worst case" example of a processing delay occurring due to linear interpolation of CPE with two OFDM symbols with RS, according to some embodiments of the present disclosure.

FIG. 7 depicts a "worst case" example of a processing delay occurring due to linear interpolation of CPE with two OFDM symbols with RS, according to some embodiments of the present disclosure.

Referring to FIG. 7, the systems 500 and 600 of embodiments respectively implementing non-overlapped sliding windows and overlapped sliding windows share the design of worst case. The longest time span between two OFDM symbols with RS may be four OFDM symbols in length. For example, such a case may occur when a first DMRS symbol is at symbol 3, and when the next PTRS symbol is at symbol 7, which corresponds to a time density of 4. Accordingly, a simple interpolation method that may be supported is linear interpolation, which suitably uses two RS symbols.

Hence, in the worst case corresponding to FIG. 7, systems of embodiments of the present disclosure wait until after the seventh OFDM symbol arrives, and until after a linear interpolation processing time on symbol 3 and symbol 7, before beginning the learning-based CPE estimation. The benefit, however, is that only a single network may be suitable for all possible DMRS and PTRS patterns, according to embodiments of the present discourse.

For a non-overlapped system 500 implementing non-overlapped sliding windows, as shown in FIG. 5, the timing is such that, after the seventh OFDM symbol is received, in addition to an amount of time suitable for one linear CPE interpolation from two RS symbols, the first seven of the interpolated CPE estimates may be used as input features to the input layer 310 of the network for the first half of the slot, and a remainder of the CPE estimates may be applied as input features to the input layer 310 of the network at the second half of the slot.

Figure 8:
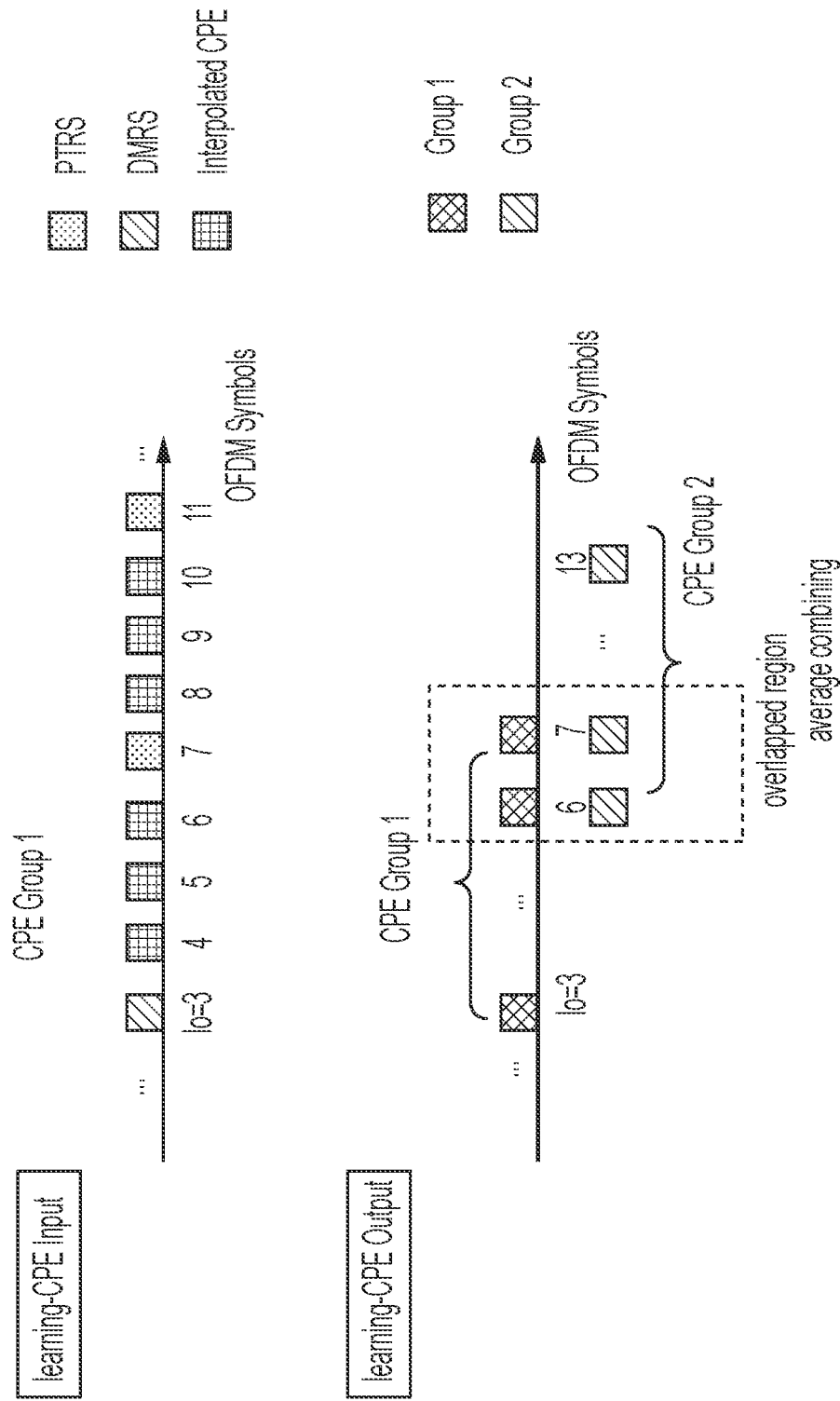
FIG. 8 depicts an input-output relationship of learning-based CPE on overlapped design, according to some embodiments of the present disclosure.

FIG. 8 depicts an input-output relationship of learning-based CPE on overlapped design, according to some embodiments of the present disclosure.

Referring to FIG. 8, for an overlapped system 600 implementing overlapped sliding windows, as shown in FIG. 6, the outputs of the networks of the systems may have an overlapped region. The input features input to the input nodes 311 of the input layer 310 of the neural network 300 may have a length of eight. The output features out from the output nodes 331 of the output layer 330 of the neural network 300 may also have an output length of eight, although the first and the second output may have an overlapped region (e.g., at OFDM symbol 6 and OFDM symbol 7). In some embodiments, averaging combining may be applied to the CPE estimates in the overlapped region.

Accordingly, systems of some embodiments may have negligible BLER performance differences, as compared to comparative systems, yet the systems of some embodiments may effectively reduce the processing delay with single network. Further, as described above, embodiments of the present disclosure may include a learning-based CPE algorithm that refines and improves a delta CPE method. The delta CPE method may be relatively robust to different FR2 channels, analog antenna settings, and various numerology under the same neural network 300 trained with different DMRS symbol configurations. Further, the learning-based method may achieve relatively substantial SNR gain on BLER performance, as compared to the legacy delta CPE method of a comparative example.

Although the above description is made with reference to embodiments of the present disclosure, those skilled in the art or those of ordinary skill in the relevant technical field will understand that various modifications and changes may be made to the present disclosure within the scope not departing from the idea and technical scope of the present disclosure described in the claims to be described below.

Therefore, the technical scope of the present disclosure should be determined by the claims without being limited to the content described in the detailed description of the specification, with functional equivalents of the claims to be included therein.

What is claimed is:

1. A method of modifying a common phase error (CPE) estimate of a slot comprising symbols, the method comprising:
receiving a number of CPE values comprising a CPE value corresponding to a symbol of the slot by an artificial neural network, the number of the CPE values being less than, or equal to, a number of the symbols of the slot;
generating a modified CPE value with the artificial neural network; and
outputting the modified CPE value from the artificial neural network.

2. The method of claim 1, further comprising:
performing common phase estimation on a reference signal (RS) symbol of the slot; and
interpolating the CPE value on a non-RS symbol of the slot.

3. The method of claim 1, further comprising outputting the modified CPE value to a channel estimation module.

4. The method of claim 1, further comprising receiving at least one of the CPE values by the artificial neural network at least twice.

5. The method of claim 1, further comprising receiving an additional CPE value by the artificial neural network separately from the CPE values comprising the CPE value.

6. The method of claim 1, wherein the CPE value that is received by the artificial neural network comprises either a calculated CPE value that is calculated based on a reference signal (RS) of an orthogonal frequency division multiplexing (OFDM) symbol, or an interpolated CPE value for a non-RS of an OFDM symbol.

7. The method of claim 1, further comprising training the artificial neural network using a measured phase noise model.

8. A common phase error (CPE) estimation device comprising an artificial neural network configured to:
receive a number of CPE values comprising a CPE value corresponding to a symbol of a slot, the number of the CPE values being less than, or equal to, a number of the symbols of the slot;
generate a modified CPE value; and
output the modified CPE value.

9. The CPE estimation device of claim 8, wherein the CPE value received by the artificial neural network is generated by:
performing common phase estimation on a reference signal (RS) symbol of the slot; and
interpolating the CPE value on a non-RS symbol of the slot.

10. The CPE estimation device of claim 8, wherein the artificial neural network is further configured to output the modified CPE value to a channel estimation module.

11. The CPE estimation device of claim 8, wherein the artificial neural network is further configured to receive at least one of the CPE values at least twice.

12. The CPE estimation device of claim 8, wherein the artificial neural network is further configured to receive an additional CPE value separately from the CPE values comprising the CPE value.

13. The CPE estimation device of claim 8, wherein the CPE value comprises either a calculated CPE value that is calculated based on a reference signal (RS) of an orthogonal frequency division multiplexing (OFDM) symbol, or an interpolated CPE value for a non-RS of an OFDM symbol.

14. The CPE estimation device of claim 8, wherein the artificial neural network is further configured to be trained using a measured phase noise model.

15. A non-transitory computer readable medium implemented with a common phase error (CPE) estimation device comprising an artificial neural network, the non-transitory computer readable medium having computer code that, when executed on a processor, implements a method of modifying a CPE estimate of a slot comprising symbols, the method comprising:
receiving, by the artificial neural network, a number of CPE values comprising a CPE value corresponding to a symbol of the slot to the artificial neural network, the number of the CPE values being less than, or equal to, a number of the symbols of the slot;
generating, by the artificial neural network, a modified CPE value with the artificial neural network; and
outputting, by the artificial neural network, the modified CPE value from the artificial neural network.

16. The non-transitory computer readable medium of claim 15, wherein the CPE value received by the artificial neural network is generated by:
performing common phase estimation on a reference signal (RS) symbol of the slot; and
interpolating the CPE value on a non-RS symbol of the slot.

* * * * *